(12) United States Patent
Kosters (10) Patent No.: US 7,950,830 B2
(45) Date of Patent: May 31, 2011

(54) ILLUMINATION SYSTEM FOR ILLUMINATING A DISPLAY DEVICE

(75) Inventor: Paulus G. H. Kosters, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 313 days.

(21) Appl. No.: 12/296,346

(22) PCT Filed: Apr. 11, 2007

(86) PCT No.: PCT/IB2007/051294
§ 371 (c)(1),
(2), (4) Date: Oct. 7, 2008

(87) PCT Pub. No.: WO2007/119205
PCT Pub. Date: Oct. 25, 2007

(65) Prior Publication Data
US 2009/0116220 A1    May 7, 2009

(30) Foreign Application Priority Data

Apr. 13, 2006  (EP) ..................... 06112643

(51) Int. Cl.
*F21V 7/07* (2006.01)
(52) U.S. Cl. ............. 362/296.07; 362/97.1; 362/296.01

(58) Field of Classification Search ................. 362/97.1, 362/259, 297, 296.01, 296.02, 296.05, 296.07
See application file for complete search history.

(56) References Cited

U.S. PATENT DOCUMENTS

| | | | |
|---|---|---|---|
| 5,450,295 A | 9/1995 | Nino | |
| 5,607,229 A | 3/1997 | Rykowski et al. | |
| 6,050,707 A | 4/2000 | Kondo et al. | |
| 6,840,652 B1 | 1/2005 | Hymer | |
| 7,300,175 B2 * | 11/2007 | Brukilacchio | ................ 362/231 |
| 2004/0125615 A1 | 7/2004 | Ho | |

FOREIGN PATENT DOCUMENTS

| | | |
|---|---|---|
| DE | 3402746 A1 | 8/1985 |
| EP | 0886101 A2 | 12/1998 |
| EP | 1617247 A2 | 1/2006 |
| FR | 968291 A | 11/1950 |

* cited by examiner

*Primary Examiner* — John A Ward (57) ABSTRACT

An illumination system for illuminating a display device includes a conical reflector associated with the light source for illuminating a light-exit window. The reflector is arranged for reflecting light emitted by the light source towards the light-exit window and is radially segmented into a plurality of reflector-cone segments, each including at least one convex-cone segment being convex shaped in a lateral direction with respect to a source axis for lateral distribution of light emitted by the light source over the light-exit window.

9 Claims, 5 Drawing Sheets

ILLUMINATION SYSTEM FOR ILLUMINATING A DISPLAY DEVICE

This application is a national stage application under 35 U.S.C. §371 of International Application No. PCT/IB2007/051294 filed on Apr. 11, 2007 and published in the English language on Oct. 25, 2007 as International Publication No. WO/2007/119205, which claims priority to European Application No. 06112643.9 filed on Apr. 13, 2006, all of which are hereby incorporated herein by reference.

FIELD OF THE INVENTION

The invention relates to an illumination system for illuminating a display device.

The invention also relates to a backlight illumination system and a display system comprising the backlight illumination system.

BACKGROUND OF THE INVENTION

Illumination systems which comprise a reflector for reflecting light emitted by a light source towards a light-exit window of the illumination system are known per se. They are used, inter alia, as illumination systems of (image) display devices, for example in projection systems. Such illumination systems can particularly suitably be used as an illumination source in a digital projector, so-called beamer, for projecting images or displaying a television program, a film, a video program or a DVD, or the like. In addition, such illumination systems are used for general lighting purposes, such as for large-area direct-view light emitting panels such as applied, for instance, in signage, contour lighting, and billboards. The widespread use of light emitting diodes has also made this illumination system suitable for general non-emissive displays, such as liquid crystal display devices, also referred to as LCD panels, which are used in, for example, television receivers, (computer) monitors, (cordless) telephones and portable digital assistants. In the known backlight system of a LCD panel, typically an array of the illumination systems is used over the LCD panel.

The reflector in the illumination system is, generally, in the shape of a cup which substantially surrounds the light source apart from the light-exit window. Part of the light emitted by the light sources is directly incident on the light-exit window, other parts of the light emitted by the light sources is reflected by the reflector towards the light-exit window. In general, the reflector is made of a thin sheet of a specular reflective material. The sheet is shaped by means of bending or curving or otherwise.

U.S. Pat. No. 5,607,229 discloses an illumination system for illuminating non-circular apertures, which are commonly rectangular. The illumination system comprises a reflector of substantially ellipsoidal form surrounding a light source. The reflector has a concave reflection surface formed of a plurality of curved reflective segments extending along the length of the reflection surface. Each of the reflective segments is tilted and rotated by a predetermined amount to direct light from the reflector almost entirely into the area encompassed by the rectangular aperture including portions of the area which lie outside of a circular area inscribed within the aperture.

A drawback of the known illumination system is that the distribution of light over the rectangular light-exit window is not sufficiently uniform.

SUMMARY OF THE INVENTION

It is an object of the invention to provide an illumination system having improved uniformity. According to a first aspect of the invention, the object is achieved with an illumination system comprising:
  a light source arranged on a source axis,
  a light-exit window arranged between the light source and the display device substantially perpendicularly to the source axis, and
  a conical reflector associated with the light source and arranged around the source axis for reflecting light emitted by the light source towards the light-exit window, the reflector tapering from the light-exit window towards the light source,
  the reflector being radially segmented into a plurality of reflector-cone segments, the plurality of reflector-cone segments comprising at least one convex-cone segment being convex shaped in a lateral direction with respect to the source axis for lateral distribution of light emitted by the light source over the light-exit window.

The effect of the illumination system according to the invention is that the use of the convex-cone segment enables an active redistribution of light over the light-exit window in a lateral direction. The known illumination system has a reflector constituted of concave reflector segments, where each concave reflector segment illuminates a part of the light-exit window. The distribution of light over the light-exit window may not be uniform due to, for example, emission characteristics of the light source or, for example, due to a difference in size between the reflector surface of the reflector segment and an area of the exit window illuminated by the reflector surface. The reflector according to the invention comprises a convex-cone segment. The convex-cone segment reflects part of the light in a lateral direction enabling the redistribution of light over the light-exit window from an area having increased light intensity to an area having reduced light intensity. Using the convex-cone segment enables a redistribution of light at the light-exit window and enables an improvement of the uniformity of light at the light-exit window.

The inventor has realized that the distribution of light in the known illumination system is not uniform. The known illumination system is used for illuminating a light-exit window having a shape which deviates from a circular aperture of the reflector. The known reflector is constituted of concave reflector segments. To illuminate an area of the light-exit window which lies outside the circular aperture of the reflector, a concave reflector segment is tilted. However, the area illuminated by the tilted reflector segment is generally large compared with the area illuminated by the non-tilted reflector segments having the same size. Generally, reflector segments having the same size reflect the same amount of light towards the light-exit window. By tilting the reflector segment to illuminate the non-circular aperture, the area of the light-exit window illuminated by the tilted reflector segment is generally larger than the area of the light-exit window illuminated by a non-tilted segment, resulting in a non-uniform distribution of the light over the non-circular light-exit window. The reflector according to the invention comprises a convex-cone segment. This convex-cone segment reflects part of the light in a lateral direction, typically towards an area illuminated by a neighboring reflector-cone-segment. By carefully choosing the shape of the convex-cone segment, light at the light-exit window can be redistributed in a predetermined manner from an area of the light-exit window having high light intensity to an area of the light-exit window having low light intensity, thus obtaining a uniform distribution of the light over a non-circular light-exit window.

Another benefit of the use of a convex-cone segment is that a distance between the reflector and the light-exit window can be reduced. In known systems, non-uniformity is often resolved by increasing the distance between the reflector and/or light source, and the light-exit window. In the illumination system according to the invention, the light is actively redistributed using the convex-cone segment, resulting in a uniform distribution of the light at the light-exit window. Due to this active redistribution, the distance between the light source and the light-exit window is less critical and thus the distance can be reduced.

In an embodiment of the illumination system, the light-exit window has a polygonal shape and the plurality of reflector-cone segments comprises a plurality of convex-cone segments, each convex-cone segment having a convex-segment axis intersecting with the source axis and arranged in a first imaginary plane defined by the source axis and intersecting an edge line of the light-exit window, the edge line connecting two neighboring corners of the polygonal shape of the light-exit window. A benefit of this embodiment is that each convex-cone segment distributes light emitted from the light source laterally towards the two neighboring corners of the polygonal shape. Generally, the distribution of light over a light-exit window having a polygonal shape, for example, a triangle, a rectangle, a pentagon, a hexagon, or the like, is difficult in the corners of the polygon. In the known system, the reflector segment is tilted to reach the corner of the rectangular light-exit window. However, the area illuminated by reflector segments between two corners of the rectangular light-exit window generally receives more light, because the area of the light-exit window illuminated by the non-tilted reflector segment is smaller compared to the area of the light-exit window illuminated by the tilted reflector segment. In the reflector according to the invention, a convex-cone segment is arranged between two corners of the polygonal shape of the light-exit window, reflecting light towards the corners of the polygonal shape of the light-exit window, thereby improving the uniformity of the light distribution over the polygonal-shaped light-exit window.

In a preferred embodiment of the illumination system, the plurality of reflector-cone segments comprise a plurality of concave-cone segments being concave shaped in lateral direction with respect to the source axis, each concave-cone segment having a concave-segment axis intersecting with the source axis and arranged in a second imaginary plane defined by the source axis and a corner of the polygonal shape of the light-exit window. A benefit of this embodiment is that the light distribution over an area of the light-exit window illuminated by the reflector-cone segment is altered using the concave-cone segment. The center of the area illuminated by the concave-cone segment has a high light intensity compared to the edge of the area. This high intensity area can subsequently be stretched into the corner of the polygonal shape of the light-exit window, completely filling the polygonal-shaped light-exit window with light. The edges of the area of the light-exit window illuminated by the concave-cone segment have a low light intensity compared to the center. This can be corrected using the convex-cone segments which reflect part of the light towards the area illuminated by the concave-cone segment, making the overall light-exit window uniformly illuminated.

In an embodiment of the illumination system, each concave-cone segment is arranged between two convex-cone segments.

In a favorable embodiment of the illumination system, the reflector comprises a reflecting surface constituted of the reflector-cone segments, wherein the reflecting surface is a smooth surface. A benefit of this embodiment is that a smooth reflecting surface improves uniformity. In the known illumination system, the reflective surface is constituted of separate, curved reflecting segments which are displaced with respect to each other. The areas on the light-exit window which are illuminated by each one of the separate, curved reflecting segments must be adjacent in the light-exit window. The reflecting surface according to the invention is a smooth surface where the concave-cone segment smoothly blends with the convex-cone segment. The omission of separate segments in the reflecting surface further improves the uniformity of the light over the light-exit window.

In an embodiment of the illumination system, at least one of the reflector-cone segments is convex shaped in radial direction with respect to the light-exit window. A benefit of this embodiment is that the reflected light can be radially distributed by the reflector, which enables a miniaturization of the illumination system. When the illumination system is used in an array of illumination systems, the reflector-cone segment which is convex shaped in radial direction may enable a reduction of the number of illumination systems required within the array, which generally results in a reduction of the costs.

In an embodiment of the illumination system, the light source is a light emitting diode, or a laser diode, or a light emission window of an optical waveguide.

According to a second aspect of the invention, the object is achieved with a backlight illumination system comprising an array of illumination systems as claimed in claim 1.

In an embodiment of the backlight illumination system, the light-exit window of each illumination system has a polygonal shape and each illumination system comprises a reflector comprising a plurality of convex-cone segments, each convex-cone segment having a convex-segment axis intersecting with the source axis and arranged in a first imaginary plane being defined by the source axis and intersecting an edge line of the light-exit window, the edge line connecting two neighboring corners of the polygonal shape of the light-exit window. A benefit of this embodiment is that each convex-cone segment distributes light emitted from the light source laterally towards the two neighboring corners of the polygonal shape. In each reflector of the array of illumination systems according to the invention, a convex-cone segment is arranged between two corners of the polygonal shape of the light-exit window, reflecting light towards the corners of the polygonal shape of the light-exit window. This arrangement enables a lateral redistribution of the light emitted by the light source and it enables the uniformity of the light distribution over each one of the polygonal-shaped light-exit windows to be improved individually.

In a preferred embodiment of the backlight illumination system, the light-exit window of each illumination system has a polygonal shape, a corner of one of the polygonal shapes being illuminated by a plurality of light sources of the illumination systems of the array of illumination systems, and each illumination system comprises a reflector comprising a plurality of convex-cone segments, each convex-cone segment having a convex-segment axis intersecting with the source axis and arranged in a first imaginary plane, at least one first imaginary plane of at least one of the illumination system being defined by the source axis and the corner of one of the polygonal shapes of the light-exit window. A benefit of this embodiment is that the convex-cone segment having the convex-segment axis arranged in the first imaginary plane which interacts with the corner of the polygonal shape enables a lateral redistribution of the light away from the corner. When a corner of one of the polygonal-shaped light-exit windows is illuminated by a plurality of light sources, the light intensity at this corner generally comprises contributions of each of these light sources, which often results in too high a light intensity at the corner. This typically occurs in arrays of illumination systems. The light emitted towards the corner of the light exit window must be redistributed in lateral direction with respect to the source axis. The convex-cone segment which is arranged to redistribute the light away from the corner enables a uniform distribution of light over the polygonal-shaped light-exit windows in an array of illumination systems.

According to a third aspect of the invention, the object is achieved with a display system comprising the backlight illumination system as claimed in claim 8.

BRIEF DESCRIPTION OF THE DRAWINGS

These and other aspects of the invention are apparent from and will be elucidated with reference to the embodiments described hereinafter.

In the drawings.

The Figures are purely diagrammatic and not drawn to scale. Particularly for clarity, some dimensions are exaggerated strongly. Similar components in the Figures are denoted by the same reference numerals as much as possible.

DETAILED DESCRIPTION OF THE PREFERRED EMBODIMENTS

Figure 1A:
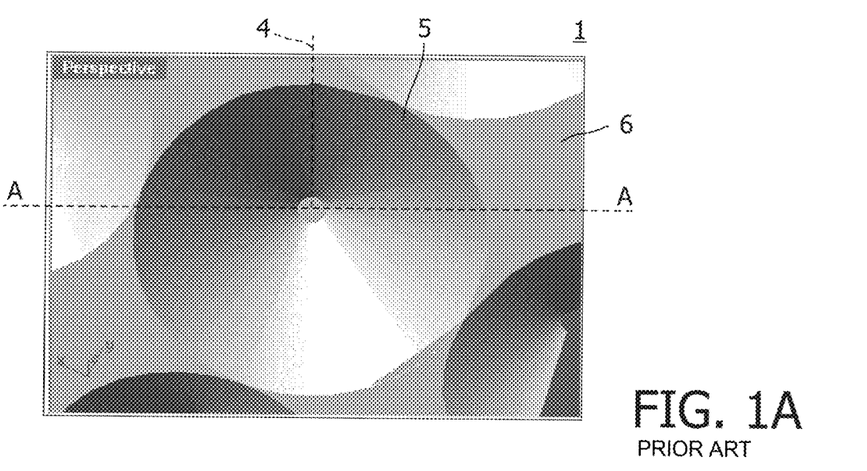
FIG. 1A shows a plan view of an array of illumination systems having a known reflector.

FIG. 1A shows a plan view of traditional illumination systems 1 arranged in a rectangular array. Each traditional illumination system 1 comprises a traditional cup-shaped reflector 5. The cup-shaped reflector 5 is arranged around a light source 2 (see FIG. 1B). The light source 2 is located on a central axis 4 which is arranged perpendicularly to the light-exit window 6. The cup-shaped reflector 5 is a well-known reflector 5 which has a conical shape. The cup-shaped reflector 5 is often used for so-called point-light sources, being relatively small light sources having a three-dimensional emission characteristic. Known point-light sources are, for example, light emitting diodes, high intensity discharge lamps such as a halogen light bulb or even a light emission window of a light guide. The cup-shaped reflector 5 is circular-symmetrically arranged around the central axis 4. In radial direction, the shape of the cup-shaped reflector 5 may be concave, convex, or linear as is shown in FIG. 1A. The array of traditional illumination systems 1, for example, constitutes a backlight illumination system used to illuminate, for example, a liquid crystal display device (not shown). The traditional illumination systems 1 are evenly distributed in a rectangular grid for illuminating the display device 8 (see FIG. 1B) via the light-exit window 6. Especially the widespread use of light emitting diodes has made a backlight illumination system comprising an array of traditional illumination systems 1, as shown in FIG. 1A, suitable for non-emissive displays, such as liquid crystal display devices.

Figure 1B:
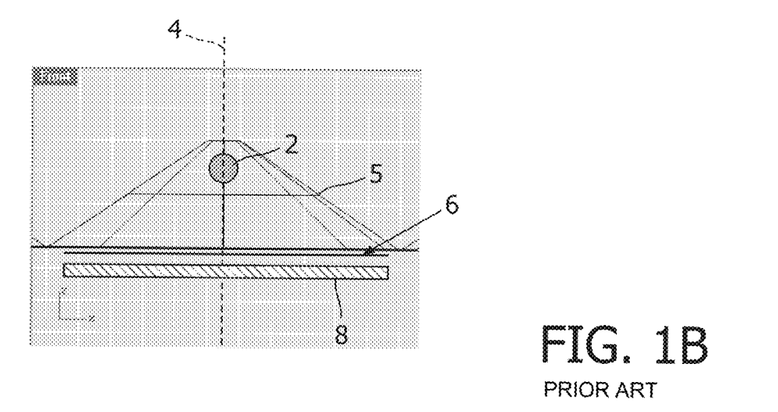
FIG. 1B shows a cross-sectional view of the known illumination system.

FIG. 1B shows a cross-sectional view of the cup-shaped reflector 5 taken along the line A-A (see FIG. 1A). The light source 2 is located on the central axis 4. The cup-shaped reflector 5 is arranged around the central axis 4 for reflecting light emitted by the light source 2 via the light-exit window 6 towards the display device 8. In radial direction, the shape of the cup-shaped reflector 5 is linear.

Figure 1C:
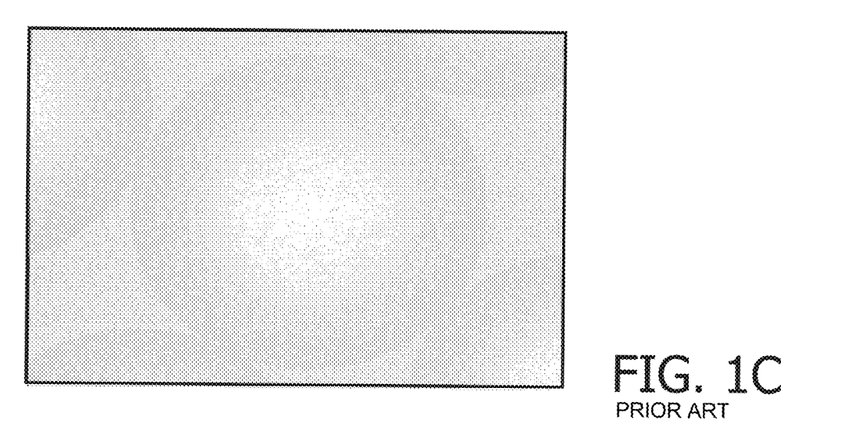
FIG. 1C shows a distribution of the light intensity over a light-exit window.

FIG. 1C shows a distribution of the light intensity over a light-exit window 6. As can be seen in FIG. 1C, the distribution of the light over the rectangular light-exit window 6 using the array of traditional illumination systems 1 having the cup-shaped reflector 5 is not uniform and clearly shows individual images of the circular apertures of the individual cup-shaped reflectors 5. One way of improving the non-uniformity shown in FIG. 1C is by increasing a distance between the light source 2 (together with the reflector 5) and the light-exit window 6. Due to the increased distance, the individual images of the circular apertures of the cup-shaped reflectors 5 are increased, causing the individual images of the circular apertures to overlap, thereby averaging out the light intensity differences over the light-exit window 6.

Figure 2A:
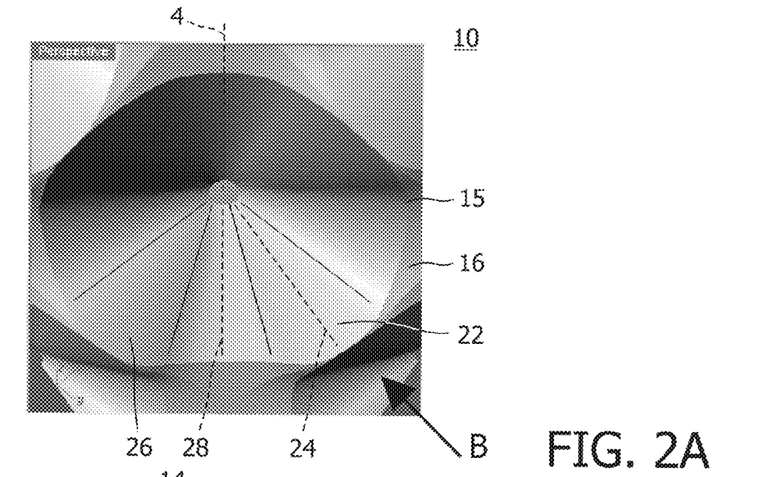
FIG. 2A shows a plan view of an array of illumination systems according to the invention.

FIG. 2A shows a plan view of an array of illumination systems 10 according to the invention. The illumination system 10 comprises a conical reflector 15 which is radially segmented into reflector-cone segments 22, 26 arranged around a source axis 14. In radial direction, the shape of the reflector-cone-segments 22, 26 may be concave, convex, or linear as is shown in FIG. 2A. The illumination system 10 shown in FIG. 2A comprises a plurality of concave-cone segments 26 and a plurality of convex-cone segments 22. The concave-cone segments 26 are concave shaped in lateral direction with respect to the source axis 14. Light emitted by the light source 12 (see FIG. 4A) is reflected by the concave-cone segment 26 towards the light-exit window 16. The concave shape of the concave-cone segment 26 focuses the reflected light in lateral direction. The concave-cone segments 26 comprise a concave-segment axis 28 defining a first angle $\alpha_1$ between the concave-cone segment 26 and the source axis 14. The convex-cone segments 22 are convex shaped in lateral direction with respect to the source axis 14. Light emitted by the light source 12 (see FIG. 4A) is reflected by the convex-cone segment 22 towards the light-exit window 16. The convex shape of the convex-cone-segment 22 spreads reflected light in lateral direction. The convex-cone segments 22 comprise a convex-segment axis 24 defining a second angle $\alpha_2$ between the convex-cone segment 22 and the source axis 14.

Figure 3A:
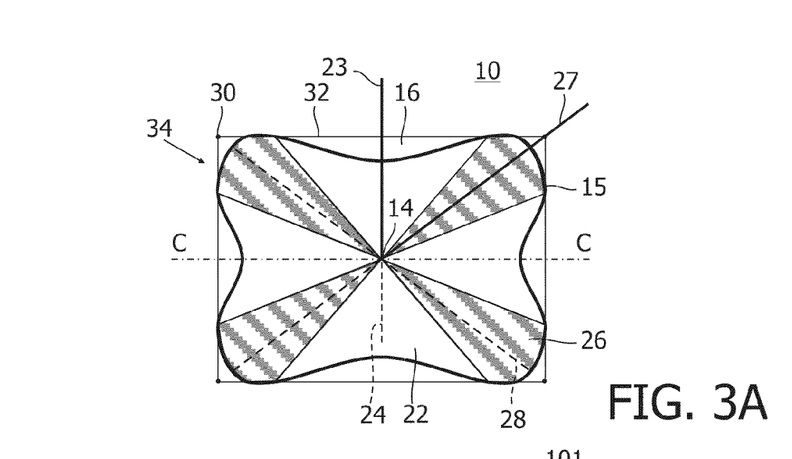
FIGS. 3A, 3B, 3C and 3D show a top view of different embodiments of the illumination system according to the invention.

The illumination system 10 shown in FIG. 2A is arranged for uniformly illuminating a light-exit window 16 shaped as a rectangle 34 (see FIG. 3A). To obtain complete illumination of the rectangular shaped 34 light-exit window 16, the concave-segment axis 28 of the concave-cone segments 26 is arranged in a second imaginary plane 27 (see FIG. 3A) defined by the source axis 14 and a corner 30 (see FIG. 3A) of the rectangular shape 34 of the light-exit window 16. Choosing the first angle $\alpha_1$ carefully enables the concave-cone segment 26 to reflect light emitted by the light source 12 towards the corner 30 of the rectangular shape 34 of the light-exit window 16. However, when the first angle $\alpha_1$ is chosen such that the concave-cone segment 26 reflects light into the corner 30 of the rectangular shape 34 of the light-exit window 16, this typically results in a reduced light intensity at a diagonal of the rectangular shaped 34 light-exit window 16 compared to the remaining area of the rectangular 34 shaped light-exit window 16. Assuming a circular-symmetric emission characteristic of the light source 12, the light reflected towards the corners 30 of the rectangular shaped 34 light-exit window 16 is stretched into the corners 30 due to the chosen first angle $\alpha_1$ of the concave-cone segment 26. To correct for this reduced light intensity at a diagonal of the rectangular shaped 34 light-exit window 16, a lateral re-distribution of the light is required. For this reason the convex-cone segments 22 are arranged between two concave-cone segments 26. Generally, the second angle $\alpha_2$ is smaller than the first angle $\alpha_1$.

Figure 2B:
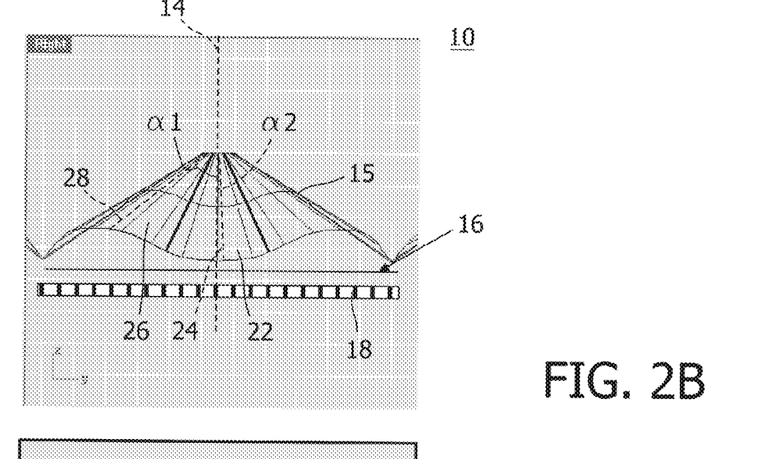
FIG. 2B shows a side view of the illumination system according to the invention.

FIG. 2B shows a side view of the illumination system 10 according to the invention, taken along the arrow B (FIG. 2A). From FIG. 2B the undulated form of an edge of the reflector 10 can clearly be seen, when concave-cone segments 26 are alternated with convex-cone segments 22.

Figure 2C:
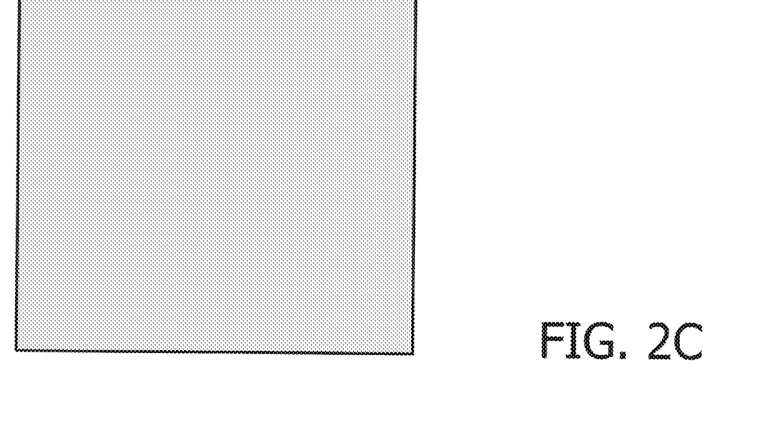
FIG. 2C shows a distribution of the light intensity over a light-exit window.

FIG. 2C shows a distribution of the light intensity over a light-exit window 16 when an array of illumination systems 10 is used as shown in FIGS. 2A and 2B. The rectangular shaped 34 light-exit window 16 is uniformly illuminated using convex-cone segments 22 in the conical reflector 15.

The exact convex shape of the convex-cone segment 22 required to uniformly illuminate a non-circular light-exit window 16 can be determined using well-known ray-tracing techniques and programs. The use of convex-cone segments 22 in a conical reflector 15 thus enables a lateral redistribution of the light over the light-exit window 16 and as such enables a uniform illumination of a non-circular light-exit window 16.

The conical reflector 15 may have further reflector-cone segments 25 (see FIG. 3B) next to the convex-cone segments 22 and the concave-cone segments 26. The further reflector-cone segments 25 may have any suitable shape.

In radial direction, the reflector 15 shown in FIGS. 2A and 2B is linear shaped. However, all or some of the reflector-cone segments 22, 25, 26 of the reflector 15 may have a concave or convex shape in radial direction. An illustration of a conical reflector 45 in which both the concave-cone segments 26 and the convex-cone segments 22 have a convex shape in radial direction is illustrated in FIG. 4B. A benefit of the radial convex shape of the reflector 45 is that it enables the reflector 45 to become smaller compared to reflectors having a different radial shape, which enables a miniaturization of the illumination system 40.

The reflective surface of the reflector 15 may either be a segmented surface where reflector-cone segments 22, 25, 26 having a different shape are joined together, or a smooth surface as shown in FIGS. 2A and 2B. A benefit of using a smooth reflective surface is that a transition from light illuminating the light-exit window 16 reflected from one reflector-cone segment 22, 25, 26 to light illuminating the light-exit window 16 reflected from another reflector-cone segment 22, 25, 26 is gradual, which improves the overall uniformity of the light distribution over the light-exit window 16.

A convex-cone segment 22 added to a reflector 15 according to the invention may also be used to improve the uniformity at the light-exit window 16 for a light source 12 not having a symmetric angular emission characteristic.

In the remainder of the Figures, all reflector-cone segments 22, 25, 26 which have a concave shape in lateral direction with respect to the source axis 14 are indicated as "concave-cone segments 26". Although the exact shape of the concave-cone segments 26 may be different in the embodiments shown, they all have a similar curvature which enables these concave-cone segments 26 to focus reflected light in lateral direction. Similarly, all reflector-cone segments 22, 25, 26 which have a convex shape in lateral direction with respect to the source axis 14 are indicated as "convex-cone segments 22". Again, the exact shape of the convex-cone segments 22 in the different embodiments may be different, but all convex-cone segments 22 have a similar curvature which enables the convex-cone segments 22 to divert the reflected light in lateral direction and as such redistribute the reflected light in lateral direction.

FIGS. 3A, 3B, 3C and 3D show a top view of different embodiments of the illumination system 10, 101, 102, 40 according to the invention. The embodiments shown in FIGS. 3A, 3B, 3C and 3D illustrate different shapes of the reflector 15, 151, 152, 45 for different polygonal-shaped 34, 35, 36 light-exit windows 16. The reflector 15, 151, 152, 45 is radially segmented in a plurality of reflector-cone segments 22, 25, 26 comprising a convex-cone segment 22 and a concave-cone segment 26. The concave-cone segment 26 comprises a concave-segment axis 28 which intersects the source axis 14 and which is arranged in a second imaginary plane 27 defined by the source axis 14 and a corner 30 of each of the polygonal shapes 34, 35, 36 (the second imaginary plane 27 is a flat imaginary plane arranged perpendicularly to the light-exit window 16). The convex-cone segment 22 comprises a convex-segment axis 24 which intersects the source axis 14 and which is arranged in a first imaginary plane 23. The first imaginary plane 23 is defined by the source axis 14 and intersects an edge line 32 of the polygonal-shaped 34, 35, 36 light-exit window 16 (the first imaginary plane 23 is an imaginary flat plane arranged perpendicularly to the light-exit window 16). The edge line 32 connects two neighboring corners 30 of the polygonal shape 34, 35, 36 of the light-exit window 16.

Figure 3B:
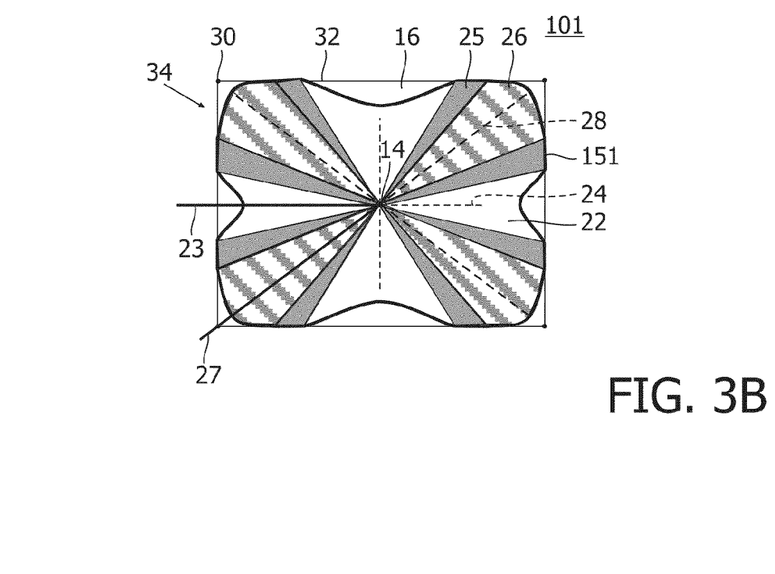
Figures 3C, 3D:
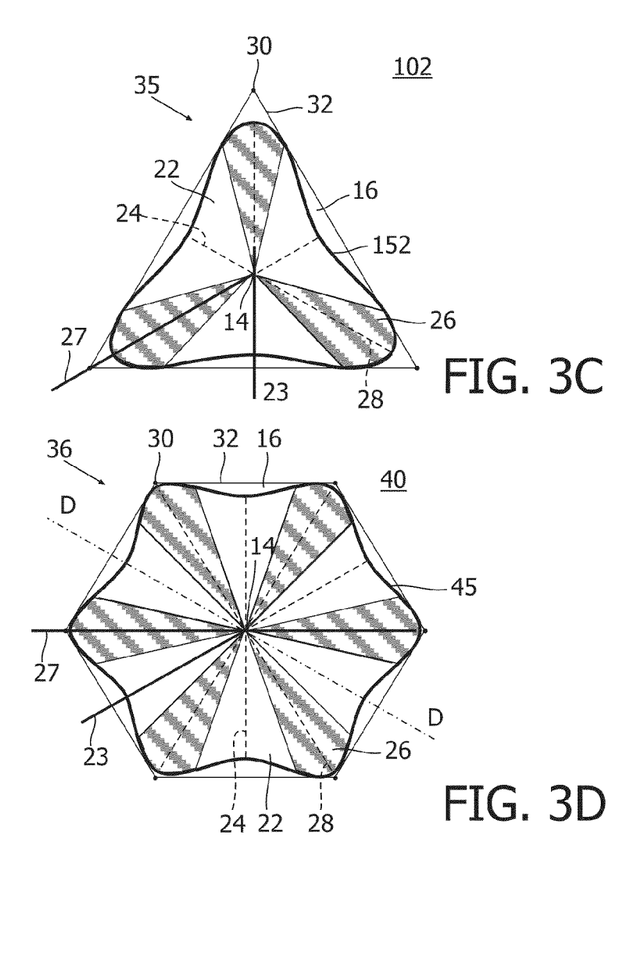

In the embodiments shown in the FIGS. 3A, 3B, 3C and 3D, the convex-segment axes 24 are symmetry axes of the convex-cone segments 22 and the first imaginary planes 23 are arranged perpendicularly to the edge line 32. However, alternative polygonal-shaped light-exit windows 16 may require a different symmetry for the convex-cone segment 22 which may be determined using, for example, well-known ray-trace programs. The concave-segment axes 28 in FIGS. 3C and 3D are also symmetry axes of the concave-cone segments 26. However, the concave-cone segments 26 shown in FIGS. 3A en 3B are not symmetric with respect to the concave-segment axes 28. This is due to the rectangular shape 34 of the light-exit window 16.

FIG. 3A shows a top view of the embodiment shown in FIG. 2A. Each convex-cone segment 22 is arranged between two concave-cone segments 26. The concave-cone segments 26 enable the rectangular-shaped 34 light-exit window 16 to be completely filled. The convex-cone segments 22 laterally redistribute the reflected light to improve the uniformity over the rectangular-shaped 34 light-exit window 16.

FIG. 3B shows a top view of an alternative embodiment of the illumination system 101 having a conical reflector 151, in which additionally further reflector-cone segments 25 are added. The further reflector-cone segments 25 may have any suitable shape defined using ray-tracing methods and programs.

FIG. 3C shows a top view of an alternative embodiment of the illumination system 102 having a conical reflector 152. The illumination system shown in FIG. 3C enables uniform illumination of a triangular-shaped 35 light-exit window 16. The reflector 152 of the illumination system 102 is constituted of concave-cone segments 26 and convex-cone segments 22; the concave-cone segments 26 ensure that the triangular-shaped 35 light-exit window 16 is substantially completely filled and the convex-cone segments 22 laterally redistribute the reflected light to obtain a uniform distribution over the triangular-shaped 35 light-exit window 16.

FIG. 3D shows a hexagonal-shaped 36 light-exit window 16. The reflector 45 of the illumination system 40 again is constituted of concave-cone segments 26 and convex-cone segments 22; the concave-cone segments 26 ensure that the hexagonal-shaped 36 light-exit window 16 is substantially completely filled and the convex-cone segments 22 laterally redistribute the reflected light to obtain a uniform distribution over the hexagonal-shaped 36 light-exit window 16. In contrast to the reflectors 15, 151, 152 shown in FIGS. 3A, 3B and 3C, where the shape of the reflector-cone segments 22, 25, 26 in radial direction is linear, in FIG. 3D the shape of the reflector cone segments 22, 26 of the reflector 45 in radial direction is convex. This can clearly be seen in the cross-sections of FIG. 3A and FIG. 3D, which are shown in FIG. 4A and FIG. 4B, respectively.

Figure 4A:
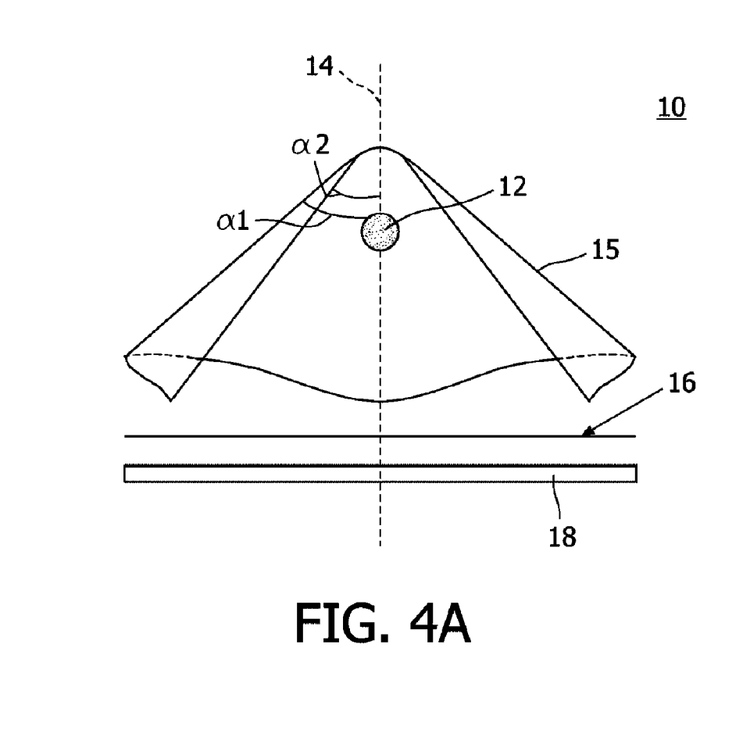
FIGS. 4A and 4B show a cross-sectional view of the illumination system according to the invention.
Figure 4B:
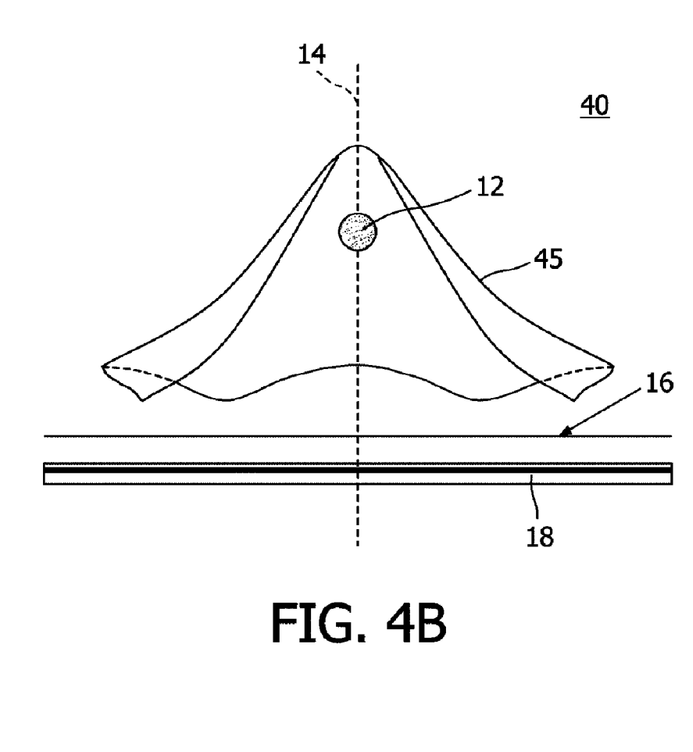

FIGS. 4A and 4B show a cross-sectional view of the illumination system 10, 40 according to the invention. Each of the cross-sectional views shows the light source 12 arranged on a source axis 14 which extends perpendicularly to the light-exit window 16. The reflector 15, 45 is arranged around the source axis 14 and reflects light emitted by the light source 12 via the light-exit window 16 towards the display device 18. In FIG. 4A, a cross-sectional view along the line C-C (see FIG. 3A) of the illumination system 10 of FIGS. 2A and 3A is shown. In radial direction, the shape of the reflector 15 of the illumination system 10 shown in FIG. 4A is linear. In FIG. 4B, a cross-sectional view of the illumination system 40 along the line D-D (see FIG. 3D) of FIG. 3D is shown. In radial direction, the shape of the reflector 45 is convex with respect to the light-exit window 16. A benefit of the radial convex shape of the reflector 45 is that it enables the reflector 45 to become smaller compared to reflectors having a different radial shape.

Figure 5A:
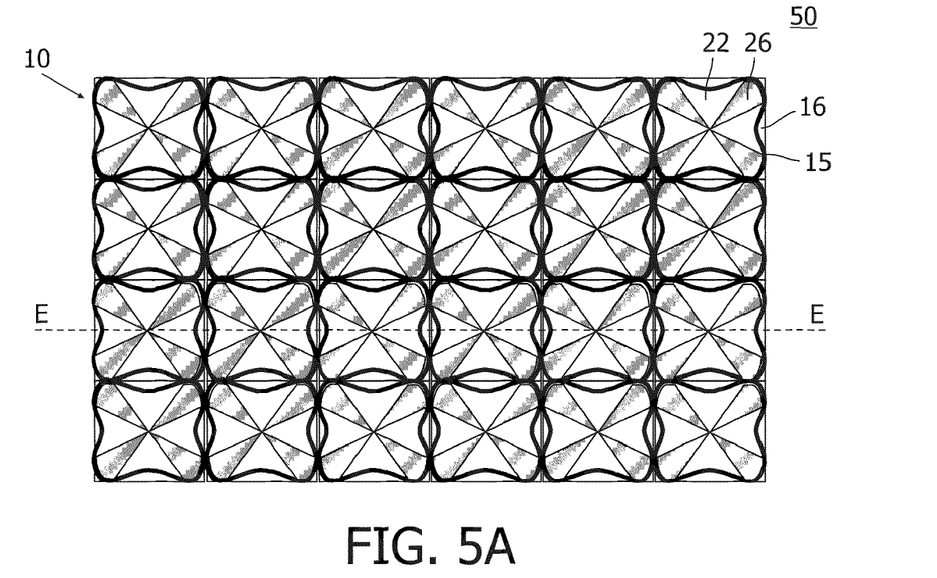
FIG. 5A shows a top view of a backlight illumination system according to the invention.
Figure 5B:
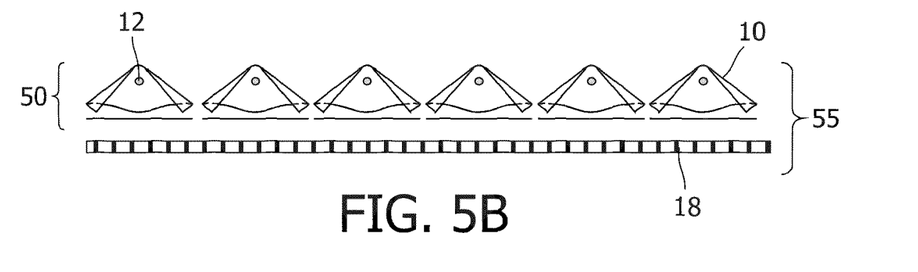
FIG. 5B shows a cross-sectional view along the line E-E (see FIG. 5A) of the backlight illumination system arranged in a display system.
Figure 5C:
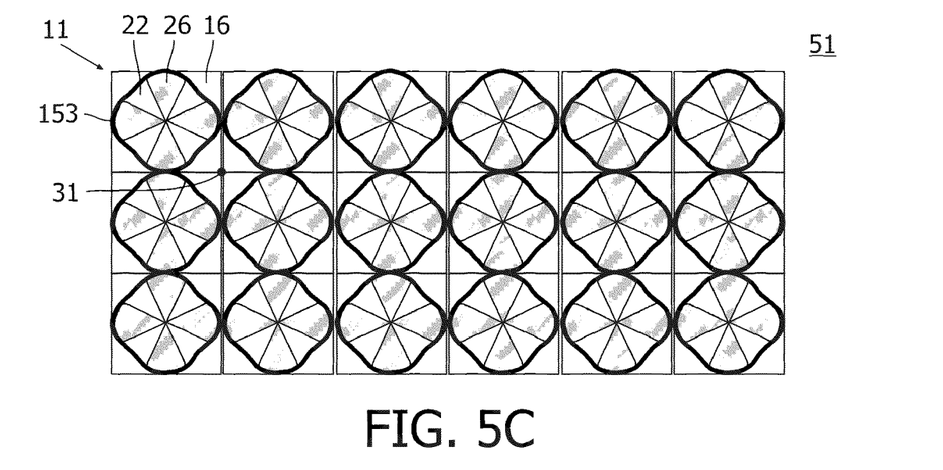
FIG. 5C shows a part of a top view of an alternative backlight illumination system according to the invention.

FIG. 5A shows a top view of a backlight illumination system 50 according to the invention. The backlight illumination system 50 comprises an array of illumination systems 10 of FIGS. 2A, 3A and 4A. In the embodiment shown in FIG. 5A, the illumination systems 10 shown constitute a two-dimensional array of illumination systems 10. FIG. 5B shows a cross-sectional view along the line E-E (see FIG. 5A) of the backlight illumination system 50 arranged in a display system 55. FIG. 5C shows a part of a top view of an alternative backlight illumination system 51 according to the invention. The backlight illumination system 51 shown in FIG. 5C is constituted of an array of illumination systems 11 comprising a reflector 153. The illumination systems 11 constitute a two-dimensional array of illumination systems 11. The reflector 153 comprises concave-cone segments 26 and convex-cone segments 22. The convex-cone segments 22 comprise a convex-segment axis 24 (not shown in FIG. 5C) intersecting with the source axis 14 (not shown in FIG. 5C) and arranged in a first imaginary plane 23 (not shown in FIG. 5C). The first imaginary planes 23 of the illumination systems 11 are defined by the source axis 14 and the corner 31 of the polygonal shape 34 of the light-exit window 16. Generally, when a distance between the light-exit window 16 and the light source 12 increases, light emitted by the light source 12 is spread out, typically also illuminating part of the neighboring light-exit windows 16. Especially the corners 31 of the light-exit windows 16 are illuminated by a plurality of light sources 12, which often results in too high a light intensity at the corners 31. The reflector 153 comprises concave-cone segments 26 which are arranged to redistribute light in lateral direction with respect to the source axis 14, away from the corner 31. The use of the reflector 153 enables a uniform distribution over the light-exit windows 16 in an array of illumination systems 11 in which light emitted by the light source 12 illuminates part of light-exit windows 16 of neighboring illumination systems 11.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system for illuminating a display device, the illumination system comprising:
   a light source arranged on a source axis,
   a light-exit window for emitting light generated by the light source, the light-exit window arranged substantially perpendicularly to the source axis and
   a conical reflector associated with the light source and arranged around the source axis for reflecting light emitted by the light source towards the light-exit window, the reflector tapering from the light-exit window towards the light source and being radially segmented into a plurality of reflector-cone segments;
   wherein the light-exit window has a polygonal shape and wherein the plurality of reflector-cone segments comprises
      a plurality of convex-cone segments, each convex-cone segment being convex-shaped in a lateral direction relative to the source axis and having a convex-segment axis intersecting with the source axis and arranged in a first imaginary plane defined by the source axis and intersecting an edge line of the light-exit window, the edge line connecting two neighboring corners of the polygonal shape of the light-exit window for lateral distribution of the light generated by the light source and emitted through the light-exit window, and
      a plurality of concave-cone segments being concave shaped in lateral direction with respect to the source axis, each concave-cone segment having a concave-segment axis intersecting with the source axis and being arranged in a second imaginary plane defined by the source axis and a corner of the polygonal shape of the light-exit window.

2. An illumination system as claimed in claim 1, wherein each concave-cone segment is arranged between two convex-cone segments.

3. An illumination system as claimed in claim 1, wherein the reflector comprises a smooth reflecting surface comprising the reflector-cone segments.

4. An illumination system as claimed in claim 1, wherein at least one of the reflector-cone segments is convex shaped in radial direction with respect to the light-exit window.

5. An illumination system as claimed in claim 1, wherein the light source is a light emitting diode, or a laser diode, or a light emission window of an optical waveguide.

6. A backlight illumination system for illuminating a display device, the backlight illumination system comprising an array of the illumination systems as claimed in claim 1.

7. A backlight illumination system as claimed in claim 6, wherein the light-exit window of each illumination system has a substantially polygonal shape and wherein each illumination system comprises a reflector comprising a plurality of convex-cone segments, each convex-cone segment having a convex-segment axis intersecting with the source axis and arranged in a first imaginary plane defined by the source axis and intersecting an edge line of the light-exit window, the edge line connecting two neighboring corners of the polygonal shape of the light-exit window.

8. A backlight illumination system as claimed in claim 6, wherein the light-exit window of each illumination system has a substantially polygonal shape, a corner of at least one of the polygonal shapes being illuminated by a plurality of light sources of at least one illumination systems of the array of illumination systems, and wherein each illumination system comprises a reflector comprising a plurality of convex-cone segments, each convex-cone segment having a convex-segment axis intersecting with the source axis and arranged in a first imaginary plane, at least one first imaginary plane of at least one of the illumination systems being defined by the source axis and the corner of the polygonal shape of the light-exit window.

9. A display system comprising the backlight illumination system, as claimed in claim 6.

* * * * *